United States Patent
Durbhakula et al.

(10) Patent No.: US 9,304,927 B2
(45) Date of Patent: Apr. 5, 2016

(54) ADAPTIVE STRIDE PREFETCHER

(75) Inventors: Suryanarayana Murthy Durbhakula, Santa Clara, CA (US); Yuan C. Chou, Los Gatos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 801 days.

(21) Appl. No.: 13/595,240

(22) Filed: Aug. 27, 2012

(65) Prior Publication Data

US 2014/0059299 A1 Feb. 27, 2014

(51) Int. Cl.
*G06F 12/00* (2006.01)
*G06F 12/08* (2006.01)

(52) U.S. Cl.
CPC .................................. *G06F 12/0862* (2013.01)

(58) Field of Classification Search
USPC ......................................................... 711/137
See application file for complete search history.

(56) References Cited

U.S. PATENT DOCUMENTS

2010/0268893 A1* 10/2010 Luttrell ......................... 711/137

* cited by examiner

*Primary Examiner* — Jared Rutz
*Assistant Examiner* — Hamdy S Ahmed
(74) *Attorney, Agent, or Firm* — Park, Vaughan, Fleming & Dowler LLP

(57) ABSTRACT

The disclosed embodiments relate to a method for dynamically changing a prefetching configuration in a computer system, wherein the prefetching configuration specifies how to change an ahead distance that specifies how many references ahead to prefetch for each stream. During operation of the computer system, the method keeps track of one or more stream lengths, wherein a stream is a sequence of memory references with a constant stride. Next, the method dynamically changes the prefetching configuration for the computer system based on observed stream lengths in a most-recent window of time.

17 Claims, 4 Drawing Sheets

ADAPTIVE STRIDE PREFETCHER

BACKGROUND

1. Field

The disclosed embodiments generally relate to techniques for improving performance in computer systems. More specifically, the disclosed embodiments relate to the design of an adaptive prefetcher that dynamically adjusts the aggressiveness of the prefetches it generates based on observed memory access patterns in a preceding time window.

2. Related Art

As the gap between processor performance and memory performance continues to grow, prefetching is becoming an increasingly important technique for improving computer system performance. Prefetching involves issuing special "prefetch instructions" to retrieve cache lines into a cache before the cache lines are actually accessed by an application. This prevents the application from having to wait for a cache line to be retrieved from memory and thereby improves computer system performance. Stride prefetchers are commonly used to prefetch a sequence of data references having a constant stride. Unfortunately, existing stride prefetchers are often too aggressive, attempting to prefetch too far ahead and issuing too many prefetches, particularly when the computer system is running in a throughput-oriented mode. Empirical results indicate that reducing prefetcher aggressiveness can result in better bandwidth utilization and better overall performance for various workloads.

However, no single prefetcher configuration works well for all workloads. Hence, using a single prefetching configuration often leads to bandwidth wastage and performance loss, especially when the system is operating in a throughput-oriented mode.

SUMMARY

The disclosed embodiments relate to a method for dynamically changing a prefetching configuration in a computer system, wherein the prefetching configuration specifies how to change an ahead distance (prefetch-ahead distance) that specifies how many references ahead to prefetch for each stream. During operation of the computer system, the method keeps track of one or more stream lengths, wherein a stream is a sequence of memory references with a constant stride. Next, the method dynamically changes the prefetching configuration for the computer system based on observed stream lengths in a most-recent window of time.

In some embodiments, each prefetching configuration also specifies an initial number of prefetches that are issued as soon as a stream is recognized.

In some embodiments, each prefetching configuration specifies transitions between a series of different ahead distances for each stream.

In some embodiments, each prefetching configuration has a different maximum ahead distance, whereby each prefetching configuration provides a different prefetching aggressiveness.

In some embodiments, keeping track of the stream lengths involves maintaining a stream buffer for each stream, wherein a given stream buffer keeps track of outstanding memory references for a stream, which involves maintaining a head pointer to determine which address to prefetch next and a tail pointer to keep track of which prefetches are consumed by demand requests.

In some embodiments, keeping track of the stream lengths involves maintaining a hit counter for each stream, wherein the hit counter keeps track of a number of demand hits for the stream.

In some embodiments, a given prefetching configuration starts with a first ahead distance for a stream, and when a number of demand hits for the stream exceeds a first threshold, switches to a second ahead distance for the stream which is larger than the first ahead distance, wherein the process repeats zero or more times for successively larger thresholds and ahead distances until a maximum ahead distance for the given prefetching configuration is reached.

In some embodiments, keeping track of the stream lengths involves periodically updating global counters associated with values of hit counters for the streams, wherein a global counter is incremented when a hit counter for a stream indicates a number of demand hits that falls within a range of demand hits associated with the global counter.

In some embodiments, each global counter is associated with a different prefetching configuration, wherein changing the prefetching configuration involves changing the prefetching configuration based on relative values contained in the global counters.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments operate by adjusting a prefetcher's aggressiveness based on application behavior. More specifically, the disclosed embodiments monitor an application's memory access patterns, and can then dynamically change a prefetching configuration based on the observed memory access patterns. This process is described in more detail below, but first we describe the structure of a computer system that uses this prefetching technique.

Computer System

Figure 1:
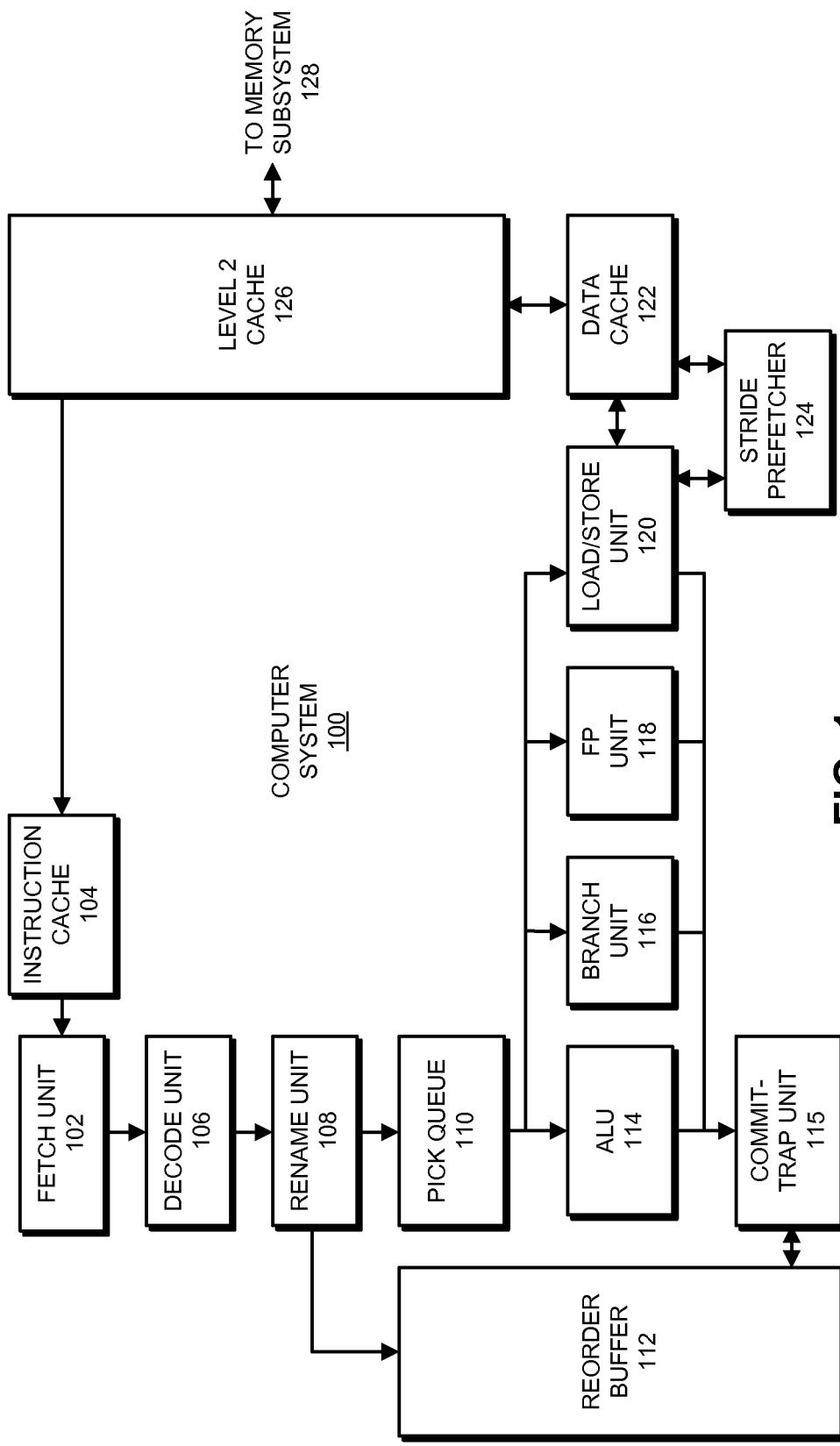
FIG. 1 illustrates a computer system in accordance with disclosed embodiments.

FIG. 1 illustrates an exemplary computer system 100 in accordance with disclosed embodiments. Computer system 100 can include any type of computer system that can make use of prefetching instructions, including a server computer system, a desktop computer system, a laptop computer system, a tablet computer system or a computer system inside a smartphone or a device controller.

Computer system 100 includes a number of components which are connected as follows. On the right side of FIG. 1, a memory subsystem 128 is coupled to a level 2 (L2) cache 126. Note that memory subsystem 128 can include a level 3 (L3) cache and a main memory. L2 cache 126 is coupled to both an instruction cache 104 and a data cache 122. During operation of computer system 100, an instruction is retrieved from instruction cache 104 by instruction fetch unit 102. This instruction feeds into a decode unit 106 and then into a register renaming unit 108. Next, the instruction feeds into pick queue 110 where it waits to receive operands so it is ready to execute and is then sent to a functional unit for execution. These functional units include arithmetic logic unit (ALU) 114, branch unit 116, floating-point (FP) unit 118 and load/store unit 120. Note that load/store unit 120 retrieves operands into a register file from data cache 122. Finally, after the instruction passes through a functional unit, the instruction passes through commit-trap unit 115 which commits the result of the instruction to the architectural state of the system. Also, a reorder buffer 112 communicates with both rename unit 108 and commit-trap unit 115 to facilitate committing instructions in-order, even though the instructions were executed out-of-order.

Computer system 100 also includes a stride prefetcher 124, which communicates with both load/store unit 120 and data cache 122 and generates prefetches for a number of streams with constant strides. Stride prefetcher 124 is configured to dynamically change prefetching configurations as is described below with reference to FIGS. 2-4.

We next describe the structure of stride prefetcher 124.

Stride Prefetcher

Figure 2:
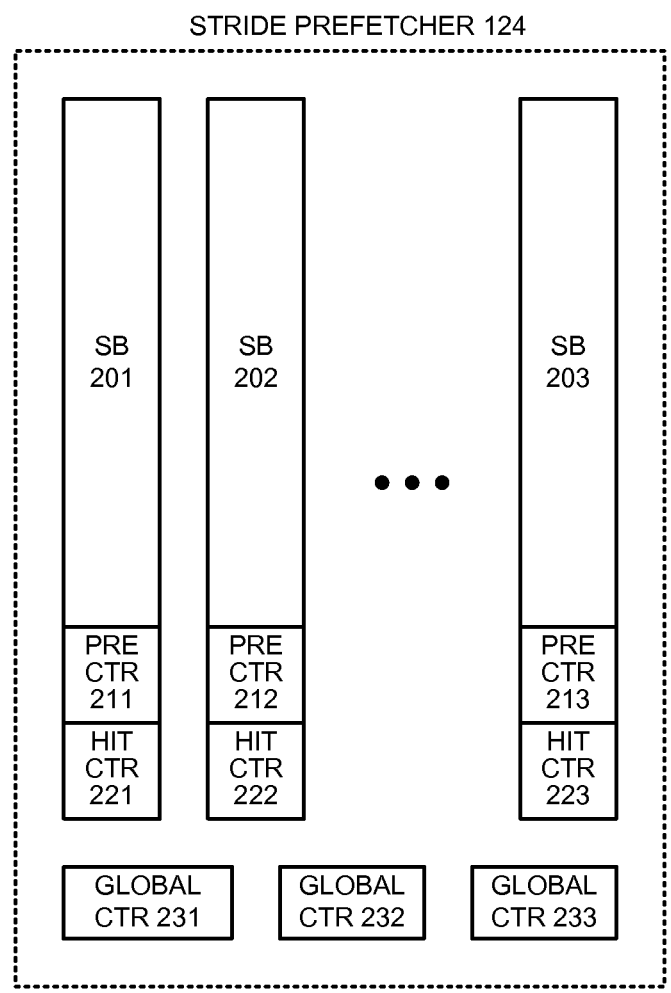
FIG. 2 illustrates a stride prefetcher in accordance with the disclosed embodiments.

FIG. 2 illustrates a stride prefetcher 124 in accordance with the disclosed embodiments. Stride prefetcher 124 includes a number of stream buffers (SBs) 201-203 to keep track of different streams, wherein a stream is a sequence of memory references with a constant stride. Each stream buffer 201-203 keeps track of outstanding memory references for a stream, which for example can involve maintaining a head pointer to determine which address to prefetch next and a tail pointer to keep track of which prefetches are consumed by demand requests. Each stream buffer 201-203 is also associated with a prefetch counter which keeps track of the number of prefetches that have been issued for the stream. More specifically, stream buffers 201-203 are associated with prefetch counters (PRE CTRs) 211-213, respectively. (Note that these prefetch counters 211-213 are not actually required for the system to be able to dynamically change prefetching configurations, only the hit counters 221-223 (described below) are needed.) Each stream buffer is additionally associated with a hit counter which keeps track of the number of demand hits received for the stream. (Note that a demand hit occurs when a prefetch retrieves a cache line and this cache line is accessed by a subsequent memory reference.) More specifically, stream buffers 201-203 are associated with hit counters (HIT CTRs) 221-223, respectively.

Finally, stride prefetcher 124 includes a number of global counters 231-233 which are used to keep track of stream lengths for the stream buffers. These global counters are periodically updated depending upon the values of hit counters for the streams, wherein a global counter is incremented when a hit counter for a stream indicates a number of demand hits that falls within a range of demand hits associated with the global counter. This process is described in more detail below.

Process of Adjusting a Prefetching Configuration

Each of these prefetching configurations can be implemented using a different prefetching parameters. For example, a number of exemplary prefetching configurations are described below.

4_16 Prefetch Configuration—A 4_16 configuration starts off issuing 4 prefetches as soon as a stream is recognized, and when 4 demand hits are detected, confidence increases and the ahead distance is increased to 8. Next, if 8 demand hits are detected, confidence increases even further, and the ahead distance is increased to the maximum of 16.

2_8 Prefetch Configuration—A 2_8 configuration starts off issuing 2 prefetches as soon as a stream is recognized, and when 2 demand hits are detected, confidence increases and the ahead distance is increased to 4. Next, if 4 demand hits are detected, confidence increases even further, and the ahead distance is increased to the maximum of 8.

2_4 Prefetch Configuration—A 2_4 configuration starts off issuing 2 prefetches as soon as a stream is recognized, and when 2 demand hits are detected, confidence increases and the ahead distance is increased to the maximum of 4.

The above-described adaptive prefetching system generally operates as follows. With every stream buffer, counters are maintained for the number of prefetches issued (e.g., prefetch counters 211-213) and the number of demand hits (e.g., hit counters 221-223). In addition, there are three global counters: PREFETCH_4_16, PREFETCH_2_8, and PREFETCH_2_4, which represent the bias of the application toward the 4_16, the 2_8, or the 2_4 configurations, respectively. At a predetermined sampling interval, all the stream buffers are examined, and depending on how the streams are performing, the three global counters are updated in the manner described below. If any one counter becomes dominant and the counter is associated with a different prefetch configuration than the current prefetch configuration, the prefetch configuration is changed to that of this counter. From then on, every new stream will be allocated in that configuration until another counter becomes dominant. For instance, if the prefetcher is currently configured in 4_16 configuration and the PREFETCH_2_8 counter becomes dominant, the prefetch configuration is changed to 2_8 configuration until another counter becomes dominant at a later time.

The global counters are incremented as follows.
(1) If the number of hits is ≤upper_bound_2_4, then PREFETCH_2_4 counter is incremented. For example, upper_bound_2_4 can be 6.
(2) If the number of hits is ≥lower_bound_2_8 and ≤upper_bound_2_8, then PREFETCH_2_8 counter is incremented. For example, lower_bound_2_8 can be 7 and upper_bound_2_8 can be 14.
(3) If the number of hits is ≥lower_bound_4_16, then PREFETCH_4_16 counter is incremented. For example, lower_bound_4_16 can be 15.

All of the global counters are examined, and if there is a dominant global counter which is associated with a different configuration than the current configuration, then that prefetch configuration is selected for all the streams allocated from then on, until another global counter becomes dominant. One way to define a dominant global counter is using a DOMINANT_FACTOR. For example PREFETCH_2_8 is dominant if, PREFETCH_2_8>DOMINANT_FACTOR*PREFETCH_4_16 and
PREFETCH_2_8>DOMINANT_FACTOR*PREFETCH_2_4.

An exemplary DOMINANT_FACTOR can be 2.

In some embodiments, once a prefetch configuration is changed all the three global counters are cleared.

Note that these global counters are all saturating counters, and they are cleared when any one of them reaches saturation. Another embodiment of this invention decreases the three global counters by an adjustment factor when a change in prefetch configuration occurs. Doing so enables the prefetcher to better adjust to the phase behavior of the application, while still retaining some of the past phase history.

Figure 3:
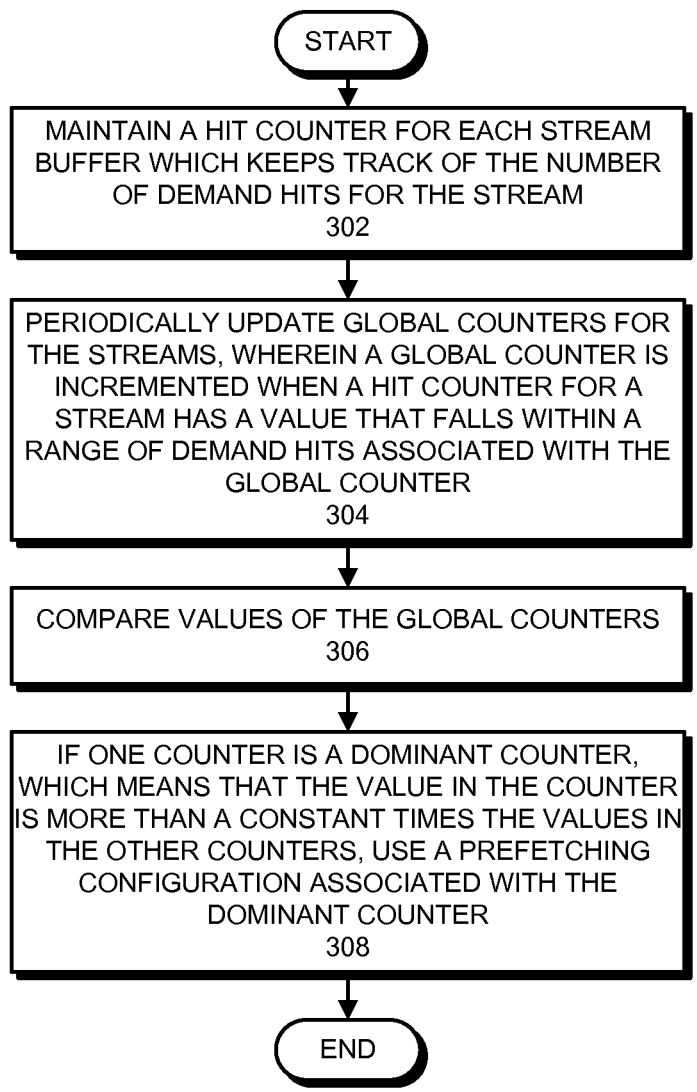
FIG. 3 presents a flow chart illustrating the process of dynamically adjusting a prefetching configuration in accordance with the disclosed embodiments.

In summary, FIG. 3 presents a flow chart illustrating the process of dynamically adjusting a prefetching configuration in accordance with the disclosed embodiments. During computer system operation, the system maintains a hit counter for each stream, wherein the hit counter keeps track of a number of demand hits for the stream (step 302). Next, the system periodically updates global counters for the streams, wherein a global counter is incremented when a hit counter for a stream falls within a range of demand hits associated with the global counter (step 304).

Next, the system periodically compares the values of the global counters (step 306). Then, if one counter is a dominant counter, which means that the value in the counter is more than a constant times the values in the other counters, the system uses a prefetching configuration associated with the dominant counter (step 308). Note that this may involve switching prefetching configurations if the dominant counter has changed.

Prefetching Configuration

Figure 4:
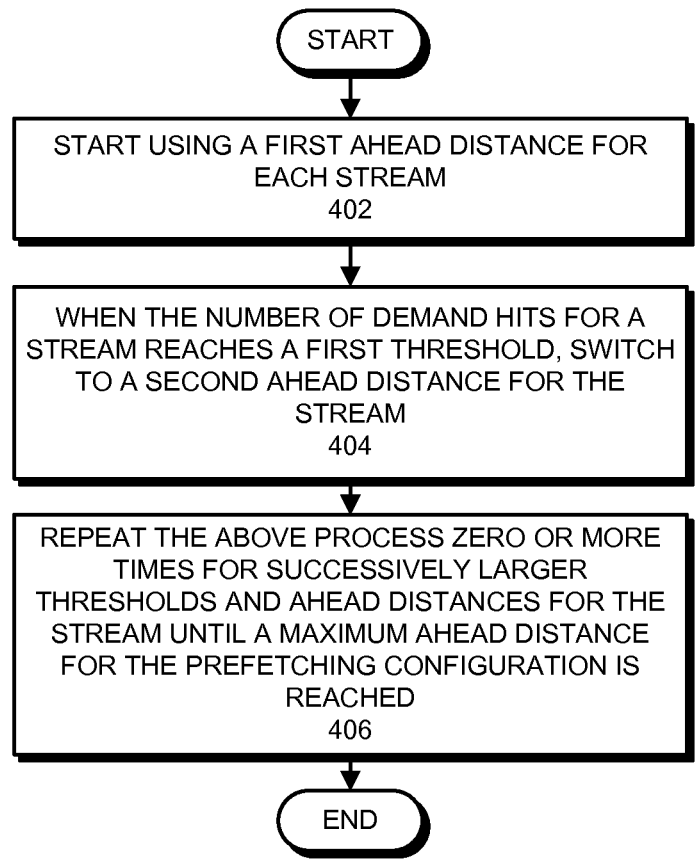
FIG. 4 presents a flow chart illustrating a specific prefetching configuration in accordance with the disclosed embodiments.

FIG. 4 presents a flow chart illustrating how a specific prefetching configuration operates in accordance with the disclosed embodiments. This prefetching configuration starts by using a first ahead distance for each stream (step 402). Next, when a number of demand hits for a stream exceeds a first threshold, the system switches to a second ahead distance for the stream, wherein the second ahead distance is larger than the first ahead distance (step 404). Then, the process in steps 402 and 404 is repeated zero or more times for successively larger thresholds and ahead distances until a maximum ahead distance for the given prefetching configuration is reached (step 406).

For example, as mentioned above, the 4_16 configuration starts off issuing 4 prefetches as soon as a stream is recognized, and when 4 demand hits are detected, the ahead distance is increased to 8. Next, if 8 demand hits are detected, the ahead distance is increased to the maximum of 16.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for dynamically changing a prefetching configuration in a computer system that supports multiple prefetching configurations, comprising:
during operation of the computer system, keeping track of stream lengths of two or more streams, wherein the keeping track involves maintaining, for each stream of the two or more streams, a hit counter for the stream that counts a number of demand hits for prefetches generated according to a given prefetching configuration from the prefetching configurations, wherein the given prefetching configuration specifies how to adjust an ahead distance that indicates how many references ahead to prefetch for the stream, and wherein the stream is a sequence of memory references with a constant stride;
maintaining a separate global counter for each of the prefetching configurations;
updating the global counter for a first of the prefetching configurations based on the number of demand hits for prefetches generated according to a different one of the prefetching configurations;
determining a dominant global counter from the global counters based on values of the global counters; and
dynamically changing the prefetching configuration for the computer system to the prefetching configuration for the stream that corresponds to the dominant global counter.

2. The method of claim 1, wherein each prefetching configuration also specifies an initial number of prefetches that are issued as soon as a stream is recognized.

3. The method of claim 1, wherein each prefetching configuration specifies transitions between a series of different ahead distances for each stream.

4. The method of claim 1, wherein each prefetching configuration has a different maximum ahead distance, whereby each prefetching configuration provides a different prefetching aggressiveness.

5. The method of claim 1, wherein keeping track of the stream lengths involves maintaining a stream buffer for each stream, wherein a given stream buffer keeps track of outstanding memory references for a stream, which involves maintaining a head pointer to determine which address to prefetch next and a tail pointer to keep track of which prefetches are consumed by demand requests.

6. The method of claim 5, wherein a given prefetching configuration starts with a first ahead distance for a stream, and when a number of demand hits for the stream reaches a first threshold, switches to a second ahead distance for the stream which is larger than the first ahead distance, and wherein the process repeats zero or more times for successively larger thresholds and ahead distances for the stream until a maximum ahead distance for the given prefetching configuration is reached.

7. The method of claim 5, wherein each global counter is associated with a different prefetching configuration, and wherein changing the prefetching configuration involves changing the prefetching configuration based on relative values contained in the global counters.

8. The method of claim 1, wherein, for each of the streams, the prefetching configuration for the stream is different from prefetching configurations for all other streams in the two or more streams, and
    wherein updating the global counter comprises periodically updating the global counter by periodically comparing the number of demand hits for each of the streams to a set of predetermined ranges of values.

9. A computer system that facilitates dynamically changing a prefetching configuration, comprising:
    at least one processor that supports multiple prefetching configurations;
    a memory; and
    a prefetch unit within the at least one processor, wherein the prefetch unit is configured to:
        keep track of stream lengths of two or more streams, wherein the keeping track involves maintaining, for each stream of the two or more streams, a hit counter for the stream that counts a number of demand hits for prefetches generated according to a given prefetching configuration from the prefetching configurations, wherein the given prefetching configuration specifies how to adjust an ahead distance that indicates how many references ahead to prefetch for the stream, and wherein the stream is a sequence of memory references with a constant stride;
        maintain a separate global counter for each of the prefetching configurations;
        update the global counter for a first of the prefetching configurations based on the number of demand hits for prefetches generated according to a different one of the prefetching configurations;
        determine a dominant global counter from the global counters based on values of the global counters; and
        dynamically change the prefetching configuration for the computer system to the prefetching configuration for the stream that corresponds to the dominant global counter.

10. The computer system of claim 9, wherein each prefetching configuration also specifies an initial number of prefetches that are issued as soon as a stream is recognized.

11. The computer system of claim 9, wherein each prefetching configuration specifies transitions between a series of different ahead distances for each stream.

12. The computer system of claim 9, wherein each prefetching configuration has a different maximum ahead distance, whereby each prefetching configuration provides a different prefetching aggressiveness.

13. The computer system of claim 9, wherein the prefetch unit keeps track of the stream lengths by maintaining a stream buffer for each stream, wherein a given stream buffer keeps track of outstanding memory references for a stream, which involves maintaining a head pointer to determine which address to prefetch next and a tail pointer to keep track of which prefetches are consumed by demand requests.

14. The computer system of claim 9, wherein a given prefetching configuration starts with a first ahead distance for a stream, and when a number of demand hits for the stream reaches a first threshold, switches to a second ahead distance for the stream which is larger than the first ahead distance, and wherein the process repeats zero or more times for successively larger thresholds and ahead distances for the stream until a maximum ahead distance for the given prefetching configuration is reached.

15. The computer system of claim 9, wherein each global counter is associated with a different prefetching configuration, and wherein changing the prefetching configuration involves changing the prefetching configuration based on relative values contained in the global counters.

16. A processor that supports dynamically changing a prefetching configuration, comprising:
    the processor, wherein the processor supports multiple prefetching configurations; and
    a prefetch unit within the processor, wherein the prefetch unit is configured to:
        keep track of stream lengths the of two or more streams, wherein the keeping track involves maintaining, for each stream of the two or more streams, a hit counter for the stream that counts a number of demand hits for prefetches generated according to a given prefetching configuration from the prefetching configurations, wherein the given prefetching configuration specifies how to adjust an ahead distance that indicates how many references ahead to prefetch for the stream, and wherein the stream is a sequence of memory references with a constant stride;
        maintain a separate global counter for each of the prefetching configurations;
        update the global counter for a first of the prefetching configurations based on the number of demand hits for prefetches generated according to a different one of the prefetching configurations;
        determine a dominant global counter from the global counters based on values of the global counters; and
        dynamically change the prefetching configuration for the computer system to the prefetching configuration for the stream that corresponds to the dominant global counter.

17. The processor of claim 16, wherein each prefetching configuration also specifies an initial number of prefetches that are issued as soon as a stream is recognized.

* * * * *